(12) United States Patent  
Iwashita et al.

(10) Patent No.: US 9,073,445 B2  
(45) Date of Patent: Jul. 7, 2015

(54) RELAY CONTROL SYSTEM FOR ELECTRIC VEHICLE AND METHOD FOR CONTROLLING RELAY OF ELECTRIC VEHICLE

(71) Applicant: HONDA MOTOR CO., LTD., Tokyo (JP)

(72) Inventors: Hideaki Iwashita, Wako (JP); Hidekazu Saito, Wako (JP); Kosuke Tachikawa, Wako (JP); Toru Ozawa, Wako (JP); Daisuke Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 492 days.

(21) Appl. No.: 13/657,863

(22) Filed: Oct. 23, 2012

(65) Prior Publication Data

US 2013/0148251 A1 Jun. 13, 2013

(30) Foreign Application Priority Data

Dec. 9, 2011 (JP) .................................. 2011-270003

(51) Int. Cl.
```
B60L 11/18      (2006.01)
H02J 7/00       (2006.01)
B60L 1/00       (2006.01)
H01H 47/32      (2006.01)
```
(52) U.S. Cl.
CPC .......... *B60L 11/1838* (2013.01); *Y02T 10/7005* (2013.01); *H01H 47/325* (2013.01); *H02J 7/0031* (2013.01); *B60L 2240/421* (2013.01); *Y02T 90/163* (2013.01); *Y02T 10/642* (2013.01); *Y02T 90/14* (2013.01); *Y02T 90/128* (2013.01); *Y02T 90/121* (2013.01)

(58) Field of Classification Search
USPC .......................................................... 307/9.1
See application file for complete search history.

(56) References Cited

U.S. PATENT DOCUMENTS

2009/0039703 A1 2/2009 Soma et al.

FOREIGN PATENT DOCUMENTS

JP 2001-320801 11/2001

OTHER PUBLICATIONS

Chinese Office Action for corresponding CN Application No. 201210454430.1, Sep. 30, 2014.

*Primary Examiner* — Robert Deberadinis  
(74) *Attorney, Agent, or Firm* — Mori & Ward, LLP

(57) ABSTRACT

A relay control system for an electric vehicle includes an electric power line, a relay, an operation member, a state sensor, a rotational speed detector, a shift position detector, and a relay disconnection permitting device. The state sensor is configured to sense that a signal circuit through which a signal related to a state of the operation member flows is changed into a disconnecting operation state. The rotational speed detector is configured to detect a rotational speed of the electric motor. The shift position detector is configured to detect a shift position of the electric vehicle. The relay disconnection permitting device permits disconnection of the relay based on the rotational speed detected by the rotational speed detector and the shift position detected by the shift position detector if the state sensor senses that the signal circuit is changed into the disconnecting operation state.

18 Claims, 7 Drawing Sheets

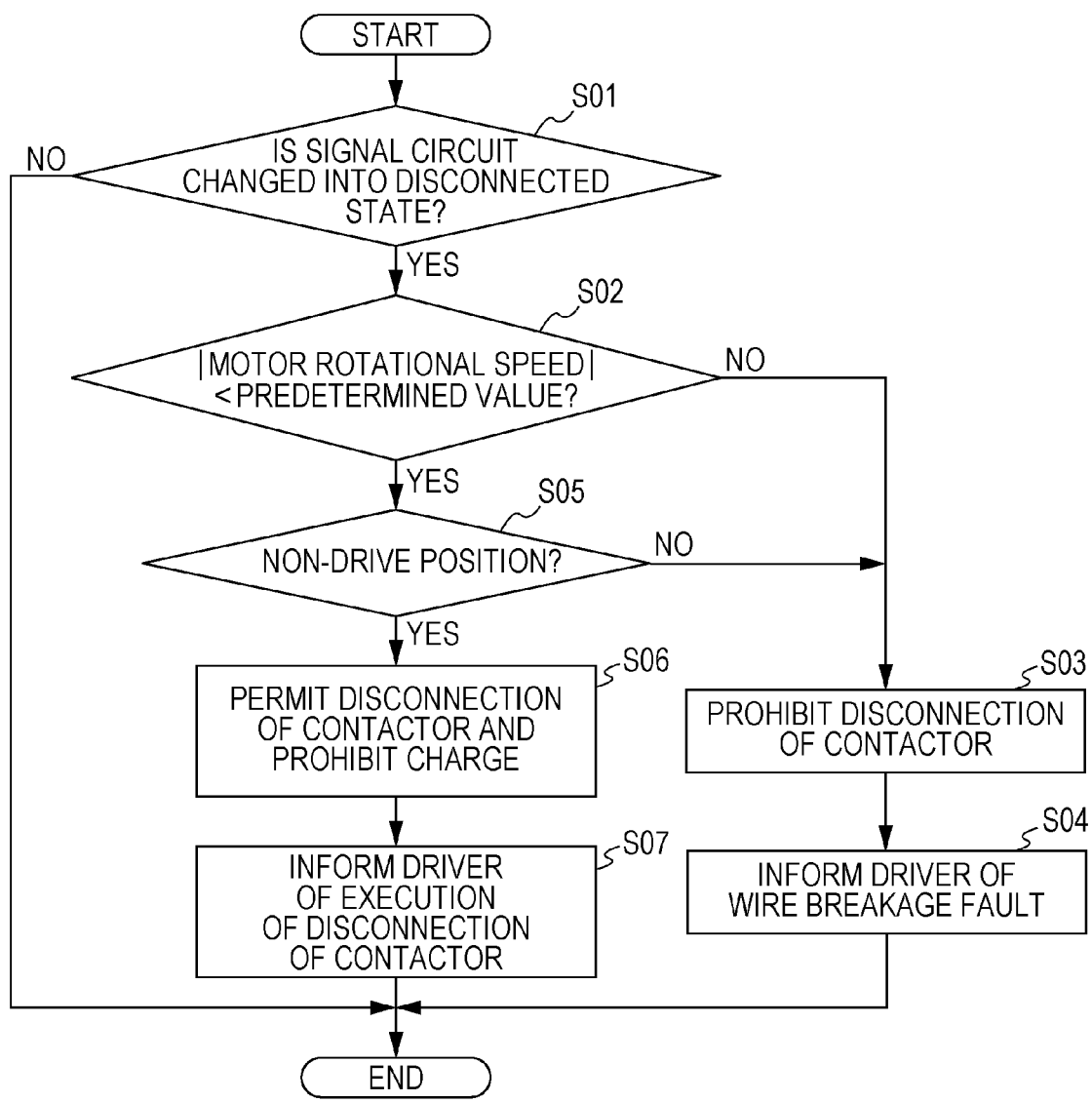

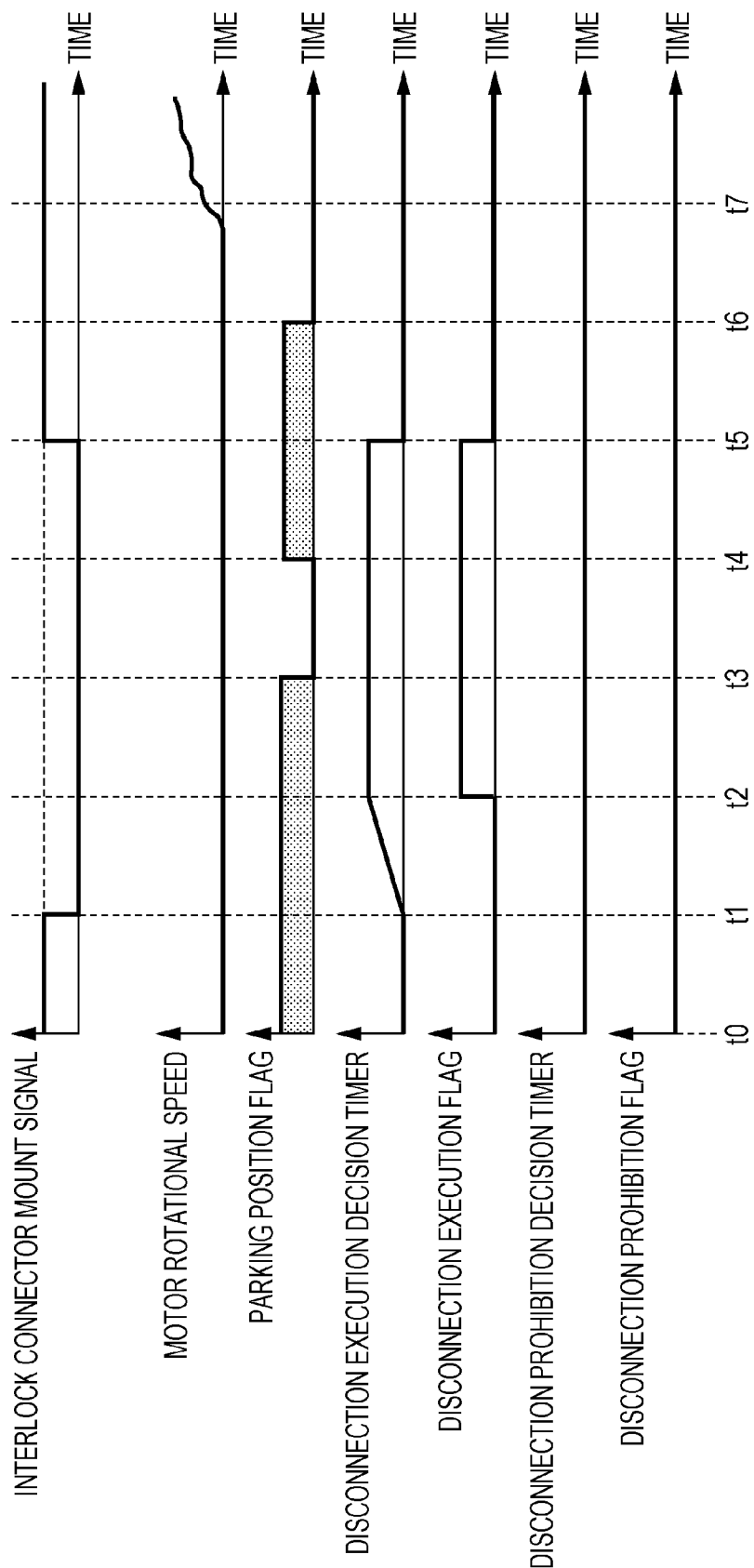

RELAY CONTROL SYSTEM FOR ELECTRIC VEHICLE AND METHOD FOR CONTROLLING RELAY OF ELECTRIC VEHICLE

CROSS-REFERENCE TO RELATED APPLICATIONS

The present application claims priority under 35 U.S.C. §119 to Japanese Patent Application No. 2011-270003, filed Dec. 9, 2011, entitled "Relay Control Device." The contents of this application are incorporated herein by reference in their entirety.

BACKGROUND OF THE INVENTION

1. Field of the Invention

The present disclosure relates to a relay control system for a electric vehicle and a method for controlling a relay of the electric vehicle.

2. Discussion of the Background

Hitherto, there has been proposed a power source control device including an operation member (a grip of a service plug) that allows a relay that connects and disconnects a high-voltage power source mounted on a vehicle to be intentionally opened during work of inspecting and maintaining the high-voltage power source, for example. Even if the relay is in an open state, the open state of the relay may not be intentional, such as in the case where it is determined that a driver has an intention to start the vehicle, with the driver executing an operation for turning on an ignition switch twice within a predetermined time, for example. In such a case, the power source control device switches the relay from the open state into a connected state to make the vehicle startable unless the service plug itself, which is capable of disconnecting the high-voltage power source, is detached (see Japanese Patent No. 3409774, for example).

SUMMARY OF THE INVENTION

According to one aspect of the present invention, a relay control system for an electric vehicle includes an electric power line, a relay, an operation member, a state sensor, a rotational speed detector, a shift position detector, and a relay disconnection permitting device. The electric power line connects an electricity accumulation device to an electric motor in the electric vehicle. The electricity accumulation device is configured to accumulate electric power. The electric motor is configured to output a drive force to move the electric vehicle. The relay is disposed on the electric power line and is configured to disconnect an electrical connection between the electricity accumulation device and the electric motor. The operation member is configured to be operated by an operator to bring the relay into a disconnected state. The state sensor is configured to sense that a signal circuit through which a signal related to a state of the operation member flows is changed into a disconnecting operation state. The rotational speed detector is configured to detect a rotational speed of the electric motor. The shift position detector is configured to detect a shift position of the electric vehicle. The relay disconnection permitting device permits disconnection of the relay based on the rotational speed detected by the rotational speed detector and the shift position detected by the shift position detector if the state sensor senses that the signal circuit is changed into the disconnecting operation state.

According to another aspect of the present invention, in a method for controlling a relay of an electric vehicle, it is sensed that a signal circuit through which a signal related to a state of a operation member flows is changed into a disconnecting operation state. The operation member is configured to be operated by an operator to bring the relay into a disconnected state. The relay is configured to disconnect an electrical connection between an electricity accumulation device and an electric motor in the electric vehicle. A rotational speed of the electric motor is detected. A shift position of the electric vehicle is detected. Disconnection of the relay is permitted based on the rotational speed detected in the detecting of the rotational speed and the shift position detected in the detecting of the shift position if it is sensed that the signal circuit is changed into the disconnecting operation state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a flowchart showing operation of the relay control device according to the embodiment.

FIG. 6 is a graph showing an example of the operation of the relay control device according to the embodiment.

DESCRIPTION OF THE EMBODIMENTS

Figure 1:
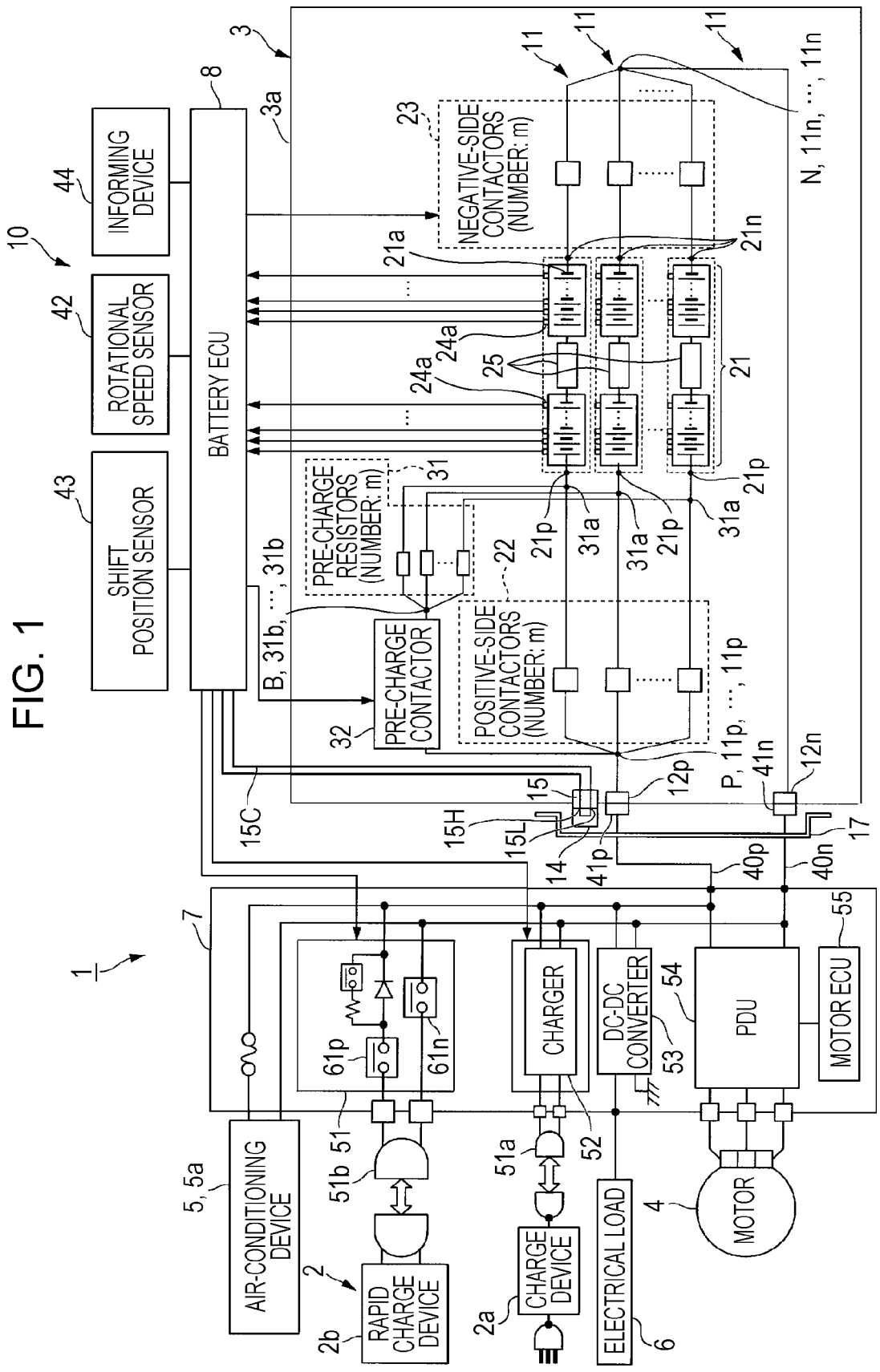
FIG. 1 shows the configuration of a relay control device according to an embodiment.

The embodiments will now be described with reference to the accompanying drawings, wherein like reference numerals designate corresponding or identical elements throughout the various drawings.

As shown, for example, in FIG. 1, a relay control device 10 according to the embodiment is mounted on an electric vehicle 1.

The electric vehicle 1 includes an electricity accumulation device 3, a motor 4, a high-voltage electrical load 5 such as an air-conditioning device 5a, a low-voltage electrical load 6 such as various types of accessories, an electric power control device 7, and a battery electronic control unit (ECU) 8, for example. The electricity accumulation device 3 can be charged by an external charge device 2 such as a charge device 2a that supplies electricity from a home power source and a rapid charge device 2b that rapidly supplies electricity from facilities such as charge stations. The motor 4 outputs a drive force for vehicle drive using electric power from the electricity accumulation device 3. A predetermined high voltage is applied to the electrical load 5. A predetermined low voltage (12 V, for example) is applied to the electrical load 6.

The relay control device 10 includes the electricity accumulation device 3 and the battery ECU 8, for example.

The electricity accumulation device 3 is formed by connecting m power source units 11, ..., 11 in parallel with each other, for example, where m is a natural number of 2 or more. The electricity accumulation device 3 includes a positive-side joint portion P and a negative-side joint portion N. Respective positive-side terminals $11p$ of the m power source units 11 are joined to each other at the positive-side joint portion P. Respective negative-side terminals $11n$ of the m power source units 11 are joined to each other at the negative-side joint portion N.

The positive-side joint portion P and the negative-side joint portion N of the electricity accumulation device 3 are connected to positive and negative connection terminal portions $12p$ and $12n$, respectively, provided on a housing (battery box) $3a$ of the electricity accumulation device 3. The m power source units 11, ..., 11 are connected in parallel with the positive and negative connection terminal portions $12p$ and $12n$.

Each of the power source units 11 includes a battery unit 21, a positive-side contactor 22, a negative-side contactor 23, and voltage sensors $24a$, for example. The battery unit 21 is formed by connecting a plurality of battery cells $21a, \ldots, 21a$ in series with each other. The positive-side contactor 22 is connected in series between a positive-side terminal $21p$ of the battery unit 21 and the positive-side joint portion P so as to be electrically connectable and disconnectable. The negative-side contactor 23 is connected in series between a negative-side terminal $21n$ of the battery unit 21 and the negative-side joint portion N so as to be electrically connectable and disconnectable. The voltage sensors $24a$ detect respective voltages of the battery cells $21a$.

The battery unit 21 includes a disconnection mechanism 25 provided at an appropriate connection position in the plurality of battery cells $21a, \ldots, 21a$ connected in series with each other and formed by a switch, a fuse, or the like capable of disconnecting continuity, for example.

The disconnection mechanism 25 can disconnect continuity automatically in the case where a current at a predetermined value or more is applied, or in response to an operation performed by an operator, for example, and can restore continuity in response to an operation performed by the operator.

Each of the power source units 11 includes a pre-charge resistor 31, a first end $31a$ of which is connected between the positive-side terminal $21p$ of the battery unit 21 and the positive-side contactor 22, for example.

The electricity accumulation device 3 includes one pre-charge contactor 32 connected in series between a resistor joint portion B and the positive-side joint portion P so as to be electrically connectable and disconnectable. The resistor joint portion B is formed by joining respective second ends $31b$ of the pre-charge resistors 31 of the m power source units 11, ..., 11 to each other.

Figure 2A:
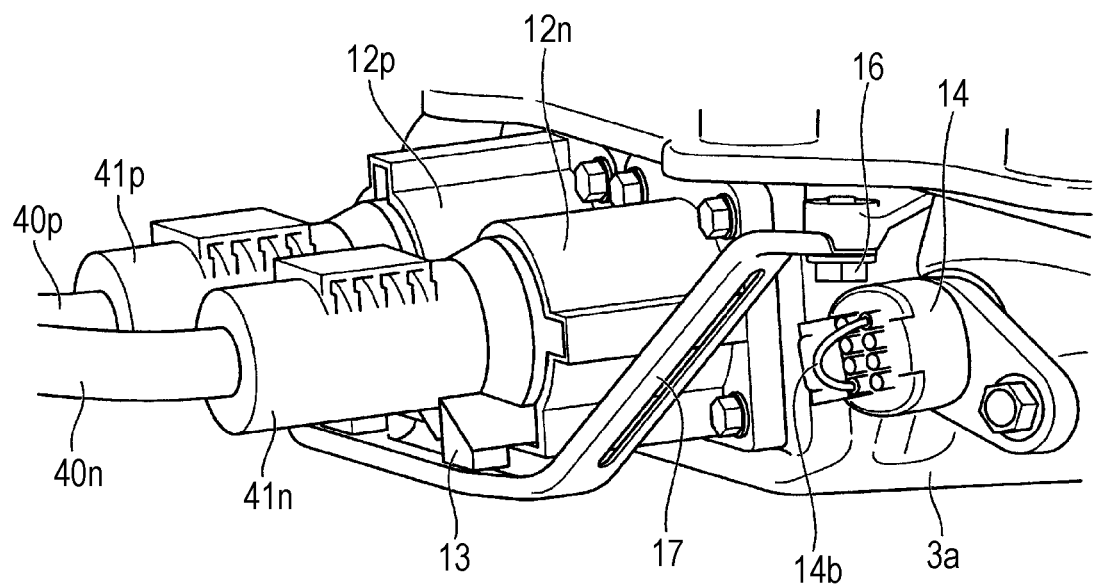
FIGS. 2A and 2B show the configuration of a part of an electricity accumulation device of the relay control device according to the embodiment.
Figure 2B:
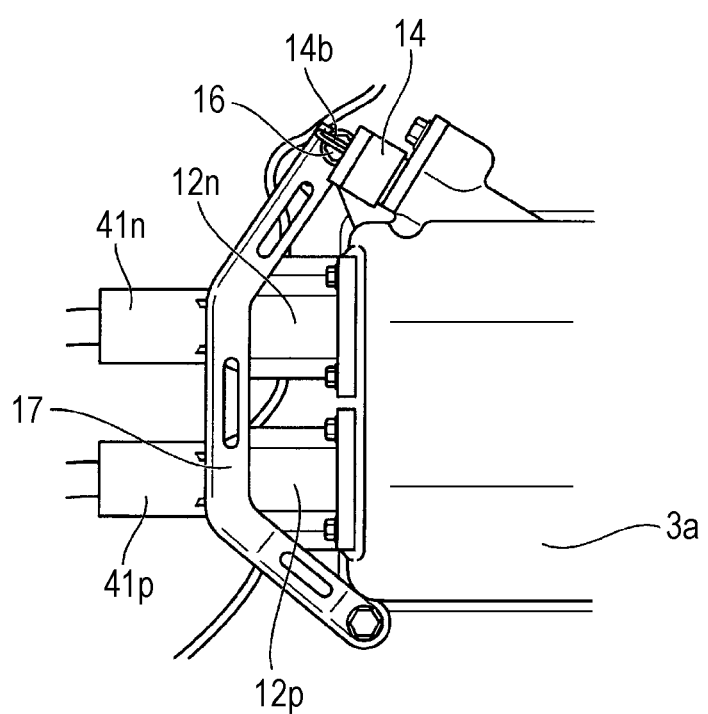

As shown, for example, in FIGS. 2A and 2B, the housing (battery box) $3a$ of the electricity accumulation device 3 is provided with the positive and negative connection terminal portions $12p$ and $12n$, a DC connector lock 13, an interlock connector connection terminal portion 15, and a bracket 17. DC connectors $41p$ and $41n$ provided at respective end portions of positive and negative electric power lines $40p$ and $40n$ connected to the electric power control device 7 are removably connected to the positive and negative connection terminal portions $12p$ and $12n$, respectively. The DC connector lock 13 is formed by a push switch or the like, for example. An interlock connector 14 is removably mounted to the interlock connector connection terminal portion 15. The bracket 17 is removably mounted using a bracket fixation bolt 16.

The DC connectors $41p$ and $41n$ are removably connected to the positive and negative connection terminal portions $12p$ and $12n$, respectively, of the battery box $3a$. The DC connectors $41p$ and $41n$ connected to the connection terminal portions $12p$ and $12n$ can be disconnected from the connection terminal portions $12p$ and $12n$, respectively, when the DC connector lock 13 formed by a push switch, for example, is operated.

The DC connector lock 13 is provided at a position around the distal end portions of the DC connectors $41p$ and $41n$, for example. A part of the bracket 17 mounted to the battery box $3a$ is disposed at a position interfering with the direction of operation of the DC connector lock 13 (in the direction of pushing operation, for example).

That is, when the bracket 17 is fixed to the battery box $3a$ using the bracket fixation bolt 16, the bracket 17 interferes with the direction of operation of the DC connector lock 13, which makes the DC connector lock 13 inoperable. When the bracket fixation bolt 16 is detached to dismount the bracket 17 from the battery box $3a$, on the other hand, the DC connector lock 13 becomes operable.

The interlock connector 14 removably connected to the interlock connector connection terminal portion 15 of the battery box $3a$ includes a grip portion $14b$ that can be grasped by fingers of the operator. The interlock connector 14 connected to the interlock connector connection terminal portion 15 can be detached from the interlock connector connection terminal portion 15 by applying a force in the direction of detachment to the grip portion $14b$, for example.

A signal corresponding to the state of connection/disconnection of the interlock connector 14 to/from the interlock connector connection terminal portion 15 is input to the battery ECU 8.

The battery ECU 8 controls opening and closing of the positive-side contactor 22 and the negative-side contactor 23 (that is, controls the positive-side contactor 22 and the negative-side contactor 23 between the disconnected state and the connected state) in accordance with the state of connection/disconnection of the interlock connector 14. The positive-side contactor 22 and the negative-side contactor 23 are capable of disconnecting continuity of electric power lines connecting between the connection terminal portions $12p$ and $12n$ and the battery units 21 in the battery box $3a$.

Figure 3A:
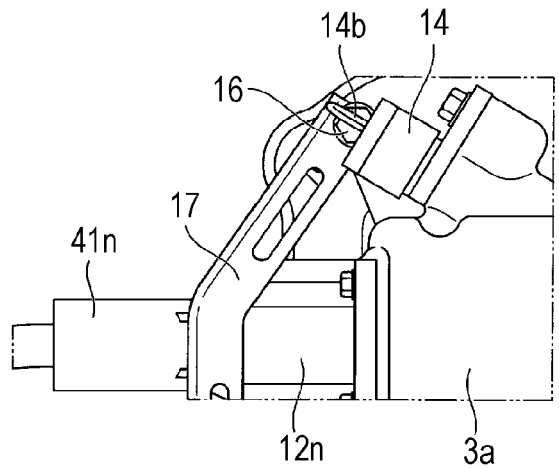
FIGS. 3A to 3C show a process in which a DC connector is detached from the electricity accumulation device of the relay control device according to the embodiment.
Figure 4A:
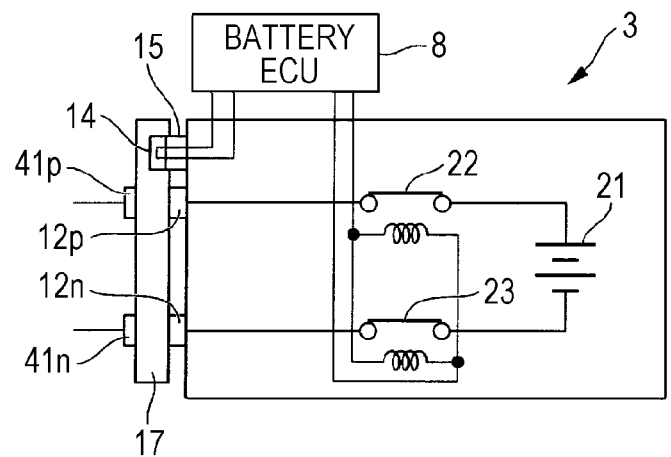
FIGS. 4A to 4C show a state of a positive-side contactor and a negative-side contactor during detachment of the DC connector from the electricity accumulation device of the relay control device according to the embodiment.
Figure 4B:
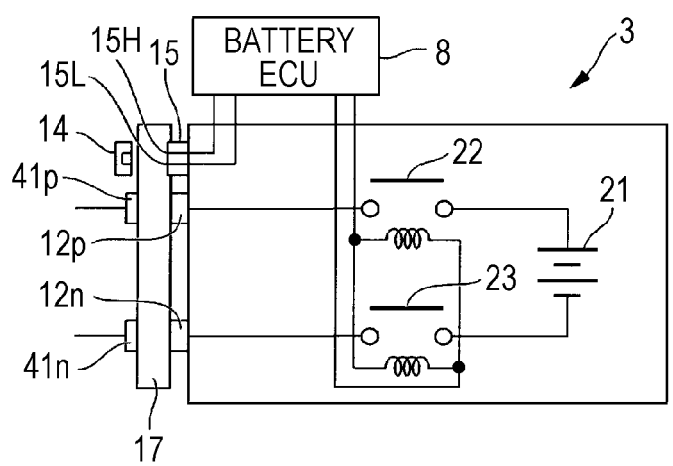
Figure 4C:
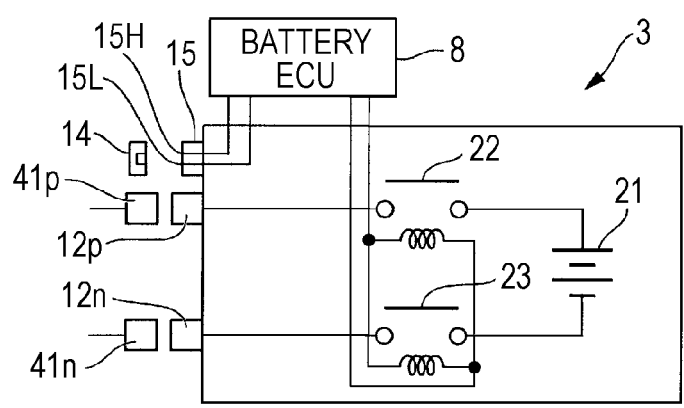

For example, in the case where the interlock connector 14 is mounted to the interlock connector connection terminal portion 15 as shown in FIGS. 3A and 4A, the battery ECU 8 allows the positive-side contactor 22 and the negative-side contactor 23 to be switchable between the connected state and the disconnected state in accordance with the state of operation. For example, the positive-side contactor 22 and the negative-side contactor 23 are brought into the disconnected state when a start switch that commands execution of operation the electric vehicle 1 is turned off, and are brought into the connected state when the start switch is turned on.

In the case where the interlock connector 14 is detached from the interlock connector connection terminal portion 15 as shown in FIGS. 3B, 3C, 4B, and 4C, on the other hand, at least the positive-side contactor 22 or the negative-side contactor 23 (both the positive-side contactor 22 and the negative-side contactor 23, for example) may be brought into the disconnected state in accordance with the rotational speed of the motor 4 (motor rotational speed) and the shift position of the electric vehicle 1 as discussed later.

When the interlock connector 14 is connected to the interlock connector connection terminal portion 15 of the battery box $3a$ as shown, for example, in FIG. 3A, the grip portion $14b$ is disposed at a position interfering with the direction in which a tool is fitted onto the bracket fixation bolt 16 which fixes the bracket 17 to the battery box $3a$.

That is, in the case where interlock connector 14 is connected to the interlock connector connection terminal portion 15 of the battery box 3a with the bracket 17 fixed to the battery box 3a using the bracket fixation bolt 16, the tool may not be fitted onto the bracket fixation bolt 16, and the bracket fixation bolt 16 and the bracket 17 may not be detached from the battery box 3a.

Figure 3B:
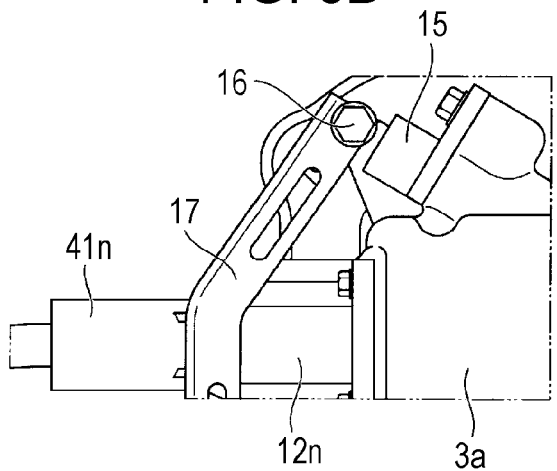

In the case where the interlock connector 14 is removed from the interlock connector connection terminal portion 15 of the battery box 3a as shown, for example, in FIG. 3B, on the other hand, the tool may be fitted onto the bracket fixation bolt 16 with the bracket fixation bolt 16 exposed, and the bracket fixation bolt 16 and the bracket 17 may be detached from the battery box 3a.

In detaching the DC connectors 41p and 41n connected to the connection terminal portions 12p and 12n of the battery box 3a from the connection terminal portions 12p and 12n, respectively, to expose respective contact points of the connection terminal portions 12p and 12n and the DC connectors 41p and 41n, first, the interlock connector 14 connected to the interlock connector connection terminal portion 15 of the battery box 3a is detached as shown, for example, in FIG. 3B. This allows the tool to be fitted onto the bracket fixation bolt 16. This further brings the positive-side contactor 22 and the negative-side contactor 23, which are disposed on electric power lines connecting between the connection terminal portions 12p and 12n and the battery units 21 in the battery box 3, into the disconnected state in accordance with the rotational speed of the motor 4 and the shift position of the electric vehicle 1 as discussed later.

Figure 3C:
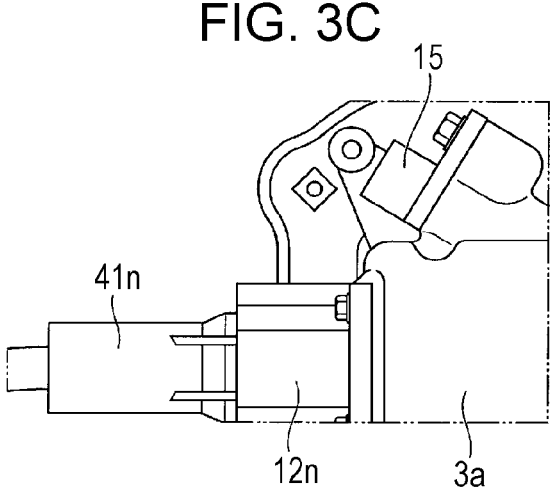

Next, the tool is fitted onto the bracket fixation bolt 16, and the bracket fixation bolt 16 and the bracket 17 are detached from the battery box 3a, as shown, for example, in FIG. 3C. This makes the DC connector lock 13 operable by the operator.

Next, when the DC connector lock 13 is operated, the DC connectors 41p and 41n connected to the connection terminal portions 12p and 12n of the battery box 3a can be detached from the connection terminal portions 12p and 12n, respectively. The DC connectors 41p and 41n are detached from the connection terminal portions 12p and 12n, respectively, with the DC connector lock 13 operated.

The electric power control device 7 includes a rapid charger 51, a charger 52, a DC-DC converter 53, a power drive unit (PDU) 54, and a motor electronic control unit (ECU) 55, for example. The rapid charger 51 and the charger 52 can be connected to the external charge device 2 such as the rapid charge device 2b and the charge device 2a via plugs 51b and 51a, respectively. The DC-DC converter 53 is connected to the low-voltage electrical load 6. The PDU 54 includes an inverter that controls energization of the motor 4. The motor ECU 55 is formed by an electronic circuit such as a central processing unit (CPU), for example, and controls operation of the PDU 54.

The rapid charger 51 includes contactors 61p and 61n connected to a positive pole and a negative pole, respectively, of the rapid charge plug 51b which can be connected to the rapid charge device 2b, for example. The battery ECU 8 controls the contactors 61p and 61n into the connected state during rapid charge, for example, and controls the contactors 61p and 61n into the open state when charge is stopped.

Operation of the charger 52 connected to the charge plug 51a which can be connected to the charge device 2a can be controlled by the battery ECU 8.

The DC-DC converter 53 drops the voltage of the electricity accumulation device 3 to a predetermined voltage (12 V, for example), for example, to apply the resulting voltage to the low-voltage electrical load 6.

The PDU 54 controls power-running operation and regenerative operation of the motor 4 in accordance with electric power conversion operation performed in accordance with control by the motor ECU 55, for example.

The battery ECU 8 applies a predetermined voltage between two insulated terminals of the interlock connector connection terminal portion 15, namely a high-side terminal 15H and a low-side terminal 15L, at all times, for example, and detects changes in voltage corresponding to attachment and detachment of the interlock connector 14 which connects between the terminals 15H and 15L when the interlock connector 14 is mounted.

For example, in the case where the interlock connector 14 is mounted to the interlock connector connection terminal portion 15, the battery ECU 8 detects a voltage signal with a predetermined low-side voltage value due to loopback caused by connection between the high-side terminal 15H and the low-side terminal 15L.

In the case where the interlock connector 14 is not mounted to the interlock connector connection terminal portion 15, on the other hand, the battery ECU 8 detects a voltage signal with a predetermined high-side voltage value due to disconnection between the high-side terminal 15H and the low-side terminal 15L of the interlock connector connection terminal portion 15.

Thus, in the case where a voltage signal with the predetermined high-side voltage value is detected, for example, the battery ECU 8 senses that a signal circuit 15C through which a signal related to the state of the interlock connector 14 flows (that is, a circuit that applies a predetermined voltage from the battery ECU 8 between the high-side terminal 15H and the low-side terminal 15L of the interlock connector connection terminal portion 15 at all times) is changed into the disconnected state.

In the case where it is sensed that the signal circuit 15C is changed from the connected state into the disconnected state because of a change from a state in which the interlock connector 14 is mounted to the interlock connector connection terminal portion 15 into a state in which the interlock connector 14 is not mounted to the interlock connector connection terminal portion 15, for example, or because of occurrence of an abnormality such as a wire breakage, for example, the battery ECU 8 permits disconnection of at least the positive-side contactor 22 or the negative-side contactor 23 (both the positive-side contactor 22 and the negative-side contactor 23, for example) of the electricity accumulation device 3 on the basis of a detection signal output from a rotational speed sensor 42 and a detection signal output from a shift position sensor 43. The rotational speed sensor 42 detects the rotational speed of the motor 4. The shift position sensor 43 detects the shift position of the electric vehicle 1.

For example, in the case where the absolute value of the rotational speed of the motor 4 is less than a predetermined value and the shift position is a non-drive position (such as a parking position or a neutral position, for example) when it is sensed that the signal circuit 15C is changed from the connected state into the disconnected state, the battery ECU 8 determines that it is likely that the signal circuit 15C is intentionally changed into the disconnected state because of inspection work or the like, and permits disconnection of at least the positive-side contactor 22 or the negative-side contactor 23 of the electricity accumulation device 3.

If the absolute value of the rotational speed of the motor 4 is equal to or more than the predetermined value or the shift position is not a non-drive position, on the other hand, the battery ECU 8 determines that it is unlikely that the signal circuit 15C is intentionally changed into the disconnected state (that is, it is likely that an abnormality such as a wire breakage fault is caused), and prohibits disconnection of the positive-side contactor 22 or the negative-side contactor 23 of the electricity accumulation device 3 (that is, denies permission of disconnection).

Further, in the case where disconnection of at least the positive-side contactor 22 or the negative-side contactor 23 (both the positive-side contactor 22 and the negative-side contactor 23, for example) of the electricity accumulation device 3 is permitted, for example, the battery ECU 8 prohibits charge of the electricity accumulation device 3 from the external charge device 2 by commanding disconnection of the contactors 61*p* and 61*n* which are capable of disconnecting continuity between the rapid charge device 2*b* external to the vehicle and the electricity accumulation device 3, commanding the charger 52 to stop charge, or commanding the rapid charge device 2*b* or the charge device 2*a* external to the vehicle to stop charge.

In the case where at least the positive-side contactor 22 or the negative-side contactor 23 of the electricity accumulation device 3 is actually brought into the disconnected state after disconnection of at least the positive-side contactor 22 or the negative-side contactor 23 of the electricity accumulation device 3 is permitted, for example, the battery ECU 8 informs the driver through an informing device 44 that the disconnected state is being established.

In the case where disconnection of the positive-side contactor 22 or the negative-side contactor 23 of the electricity accumulation device 3 is prohibited, for example, the battery ECU 8 informs the driver through the informing device 44 that it is likely that an abnormality such as a wire breakage fault is caused.

In the case where it is sensed that the signal circuit 15C is changed from the connected state into the disconnected state, and disconnection of the positive-side contactor 22 or the negative-side contactor 23 of the electricity accumulation device 3 is prohibited (that is, permission of disconnection is denied), for example, the battery ECU 8 stores disconnection denial information that indicates that permission of disconnection is denied.

Even if conditions for permitting disconnection of at least the positive-side contactor 22 or the negative-side contactor 23 of the electricity accumulation device 3 are met, disconnection of the positive-side contactor 22 or the negative-side contactor 23 of the electricity accumulation device 3 is prohibited (that is, permission of disconnection is denied) over a period until the stored disconnection denial information is deleted in the case where it is sensed that the signal circuit 15C is changed from the disconnected state into the connected state, for example.

The configuration of the relay control device 10 according to the embodiment has been described above. Next, operation of the relay control device 10 will be described.

First, in step S01 shown in FIG. 5, for example, it is determined whether or not the signal circuit 15C is changed from the connected state into the disconnected state.

In the case where the determination result is "NO", the process proceeds to "END".

In the case where the determination result is "YES", on the other hand, the process proceeds to step S02.

Next, in step S02, with the rotational speed sensor 42 performing detection normally, it is determined whether or not the absolute value of the rotational speed of the motor 4 is less than a predetermined value.

In the case where the determination result is "YES", the process proceeds to step S05 to be discussed later.

In the case where the determination result is "NO", on the other hand, the process proceeds to step S03.

In step S03, it is determined that it is likely that an abnormality such as a wire breakage fault is caused, and disconnection of the positive-side contactor 22 or the negative-side contactor 23 of the electricity accumulation device 3 is prohibited (that is, permission of disconnection is denied).

Next, in step S04, the driver is informed that it is likely that an abnormality such as a wire breakage fault is caused, and the process proceeds to "END".

In step S05, with the shift position sensor 43 performing detection normally, it is determined whether or not the shift position is a non-drive position (such as the parking position or the neutral position, for example).

In the case where the determination result is "NO", the process proceeds to step S03 discussed above.

In the case where the determination result is "YES", on the other hand, the process proceeds to step S06.

In step S06, disconnection of at least the positive-side contactor 22 or the negative-side contactor 23 of the electricity accumulation device 3 is permitted to prohibit charge of the electricity accumulation device 3 from the external charge device 2.

Next, in step S07, the driver is informed that at least the positive-side contactor 22 or the negative-side contactor 23 of the electricity accumulation device 3 is in the disconnected state, and the process proceeds to "END".

In the process discussed above, in the case where it is determined that it is likely that an abnormality such as a wire breakage fault is caused and disconnection of the positive-side contactor 22 or the negative-side contactor 23 of the electricity accumulation device 3 is prohibited (that is, permission of disconnection is denied) as shown in steps S03 and S04, for example, prohibition against disconnection of the positive-side contactor 22 or the negative-side contactor 23 of the electricity accumulation device 3 (that is, denial of permission of disconnection) is maintained even if the ignition switch is turned off to stop the vehicle and the ignition switch is turned on to restart the vehicle.

A case where the interlock connector 14 is intentionally disconnected from the interlock connector connection terminal portion 15 with the shift position being the parking position, for example, will be described below.

At time t1 shown in FIG. 6, for example, at which the absolute value of the motor rotational speed is less than a predetermined value (equal to zero, for example) and the shift position is the parking position, a disconnection execution decision timer starts counting up when an interlock connector mount signal is turned from on to off. The interlock connector mount signal indicates that the interlock connector 14 is mounted to the interlock connector connection terminal portion 15.

Then, at time t2, at which the timer value of the disconnection execution decision timer reaches a predetermined timer value, the flag value of a disconnection execution flag is switched from "0" to "1", and at least the positive-side contactor 22 or the negative-side contactor 23 of the electricity accumulation device 3 is brought into the disconnected state. The disconnection execution flag permits disconnection of at least the positive-side contactor 22 or the negative-side contactor 23.

Then, even if the shift position is changed to a position other than the parking position, that is, a position other than a non-drive position, for example, as in a period from time t3 to time t4 during which at least the positive-side contactor 22 or the negative-side contactor 23 is brought into the disconnected state, for example, disconnection of at least the positive-side contactor 22 or the negative-side contactor 23 is maintained.

Then, when the interlock connector mount signal is turned from off to on with at least the positive-side contactor 22 or the negative-side contactor 23 brought into the disconnected state at time t5, for example, the timer value of the disconnection execution decision timer is reset, and the flag value of the disconnection execution flag is switched from "1" to "0". Accordingly, the positive-side contactor 22 and the negative-side contactor 23 of the electricity accumulation device 3 are switched into the connected state, and the disconnected state of at least the positive-side contactor 22 or the negative-side contactor 23 is canceled.

Then, at and after time t6, for example, the shift position is switched to a position other than the parking position, that is, a position other than a non-drive position, and the driver executes an accelerator operation or the like. Then, at and after time t7, for example, the motor 4 is driven using electric power from the electricity accumulation device 3, and the motor rotational speed is increased.

A case where the interlock connector 14 is disconnected from the interlock connector connection terminal portion 15 (or a case where a wire breakage is caused in the signal circuit 15C) while the electric vehicle 1 is driven, for example, will be described below.

Figure 7:
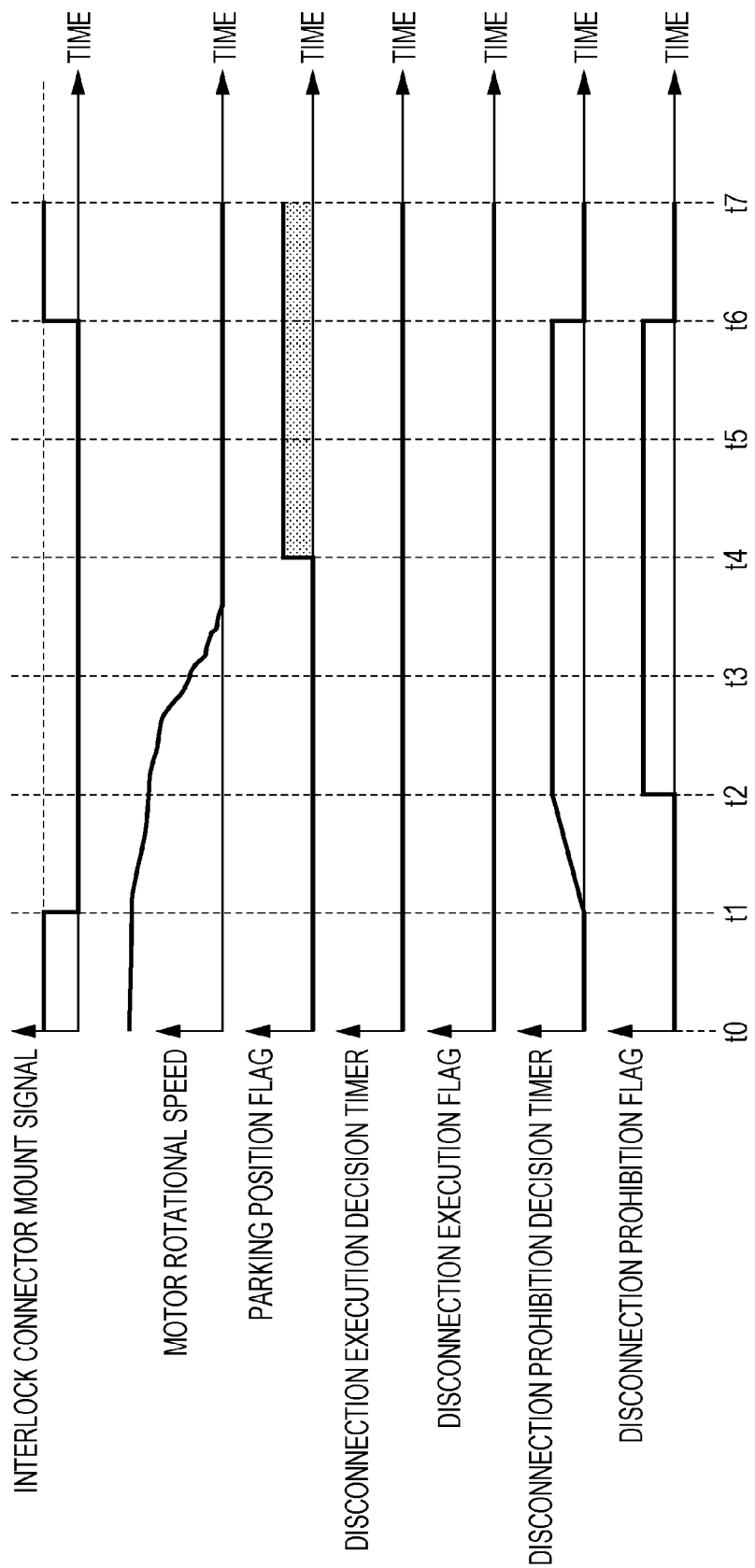
FIG. 7 is a graph showing an example of the operation of the relay control device according to the embodiment.

At time t1 shown in FIG. 7, for example, at which the electric vehicle 1 is driven with the absolute value of the motor rotational speed being not less than a predetermined value and with the shift position being a position other than a non-drive position, a disconnection prohibition decision timer starts counting up when the interlock connector mount signal is turned from on to off.

Then, at and after time t2, at which the timer value of the disconnection prohibition decision timer reaches a predetermined timer value, the flag value of a disconnection prohibition flag is switched from "0" to "1", and the positive-side contactor 22 and the negative-side contactor 23 of the electricity accumulation device 3 are maintained in the connected state. The disconnection prohibition flag prohibits disconnection of the positive-side contactor 22 or the negative-side contactor 23.

Then, even if the absolute value of the motor rotational speed is less than the predetermined value (equal to zero, for example) and the shift position is changed to the parking position with the positive-side contactor 22 and the negative-side contactor 23 maintained in the connected state at and after time t4, for example, the state in which disconnection of the positive-side contactor 22 or the negative-side contactor 23 is prohibited is maintained.

Then, when the interlock connector mount signal is turned from off to on with disconnection of the positive-side contactor 22 or the negative-side contactor 23 prohibited at time t6, for example, the timer value of the disconnection prohibition decision timer is reset, and the flag value of the disconnection prohibition flag is switched from "1" to "0".

With the relay control device 10 according to the embodiment discussed above, disconnection of the positive-side contactor 22 and the negative-side contactor 23 of the electricity accumulation device 3 is permitted on the basis of the motor rotational speed and the shift position of the electric vehicle 1. Thus, it is possible to prevent excessive disconnection, and to secure operational safety and marketability. It is further possible to accurately determine whether or not work such as inspection work is being performed, and to also secure safety during work.

For example, when it is only sensed that the signal circuit 15C is changed into the disconnected state, it is difficult to adequately determine whether the interlock connector 14 which is operable by the operator is intentionally operated, the interlock connector 14 is brought into an operated state irrespective of the intention of the operator, or an abnormality (such as a wire breakage) is caused in the signal circuit 15C.

By performing a determination on the basis of the motor rotational speed and the shift position, in contrast, it is possible to accurately determine whether or not the interlock connector 14 is intentionally operated, whether or not an abnormality is caused in the signal circuit 15C, and so forth. This makes it possible to appropriately permit disconnection of the positive-side contactor 22 and the negative-side contactor 23 of the electricity accumulation device 3.

Further, in the case where the absolute value of the motor rotational speed is less than a predetermined value (equal to zero, for example) and the shift position is a non-drive position (such as the parking position or the neutral position, for example), it is determined that it is likely that the signal circuit 15C is intentionally changed into the disconnected state because of inspection work or the like, and disconnection of the positive-side contactor 22 and the negative-side contactor 23 of the electricity accumulation device 3 can be permitted adequately.

This makes it possible to secure operational safety and marketability, and to also secure safety during work.

Further, in the case where it is determined that it is unlikely that the signal circuit 15C is intentionally changed into the disconnected state and permission of disconnection of the positive-side contactor 22 and the negative-side contactor 23 of the electricity accumulation device 3 is denied, for example, actual disconnection is prohibited, even if the motor rotational speed and the shift position meet conditions for permitting disconnection of the positive-side contactor 22 and the negative-side contactor 23 of the electricity accumulation device 3, over a period until the disconnected state is canceled, that is, until it is sensed that the signal circuit 15C is changed into the connected state. Thus, it is possible to prevent the positive-side contactor 22 and the negative-side contactor 23 from being excessively disconnected in opposition to the intention of the driver, and to secure operational safety and marketability.

Further, in the case where disconnection of the positive-side contactor 22 and the negative-side contactor 23 of the electricity accumulation device 3 is permitted, charge of the electricity accumulation device 3 from the external charge device 2 is prohibited by commanding disconnection of the contactors 61p and 61n which are capable of disconnecting continuity between the rapid charge device 2b external to the vehicle and the electricity accumulation device 3, commanding the charger 52 to stop charge, or commanding the rapid charge device 2b or the charge device 2a external to the vehicle to stop charge. Thus, it is possible to secure safety during work such as inspection work in addition to preventing execution of useless charge operation.

According to a first aspect of the embodiment, there is provided a relay control device mounted on an electric vehicle (the electric vehicle 1 according to the embodiment, for example) capable of running using electric power from an electricity accumulation device (the electricity accumulation device 3 according to the embodiment, for example), including: an electric power line (the electric power lines 40p and 40n according to the embodiment, for example) that connects between the electricity accumulation device and an electric motor (the motor 4 according to the embodiment, for example) that outputs a drive force for vehicle drive; a relay (the positive-side contactor 22 and the negative-side contactor 23 according to the embodiment, for example) disposed on the electric power line and capable of disconnecting continuity between the electricity accumulation device and the electric motor; an operation member (the interlock connector 14 according to the embodiment, for example) operable by an operator to bring the relay into a disconnected state; a state sensing unit (the battery electronic control unit (ECU) 8 according to the embodiment, for example) that senses that a signal circuit (the signal circuit 15C according to the embodiment, for example) through which a signal related to a state of the operation member flows is changed into a disconnected state; a rotational speed detection unit (the rotational speed sensor 42 according to the embodiment, for example) that detects a rotational speed of the electric motor; a shift position detection unit (the shift position sensor 43 according to the embodiment, for example) that detects a shift position of the vehicle; and a relay disconnection permitting unit (also implemented by the battery ECU 8 according to the embodiment, for example) that permits disconnection of the relay on the basis of the rotational speed detected by the rotational speed detection unit and the shift position detected by the shift position detection unit in the case where the state sensing unit senses that the signal circuit is changed into the disconnected state.

The relay control device according to the first aspect of the embodiment includes the relay disconnection permitting unit which permits disconnection of the relay on the basis of the rotational speed of the electric motor which outputs a drive force for vehicle drive and the shift position of the vehicle. Thus, it is possible to prevent the relay from being excessively disconnected, and to secure operational safety and marketability. It is further possible to accurately determine whether or not work such as inspection work is being performed, and to also secure safety during work.

For example, when the state sensing unit only senses that the signal circuit is changed into the disconnected state, it is difficult to adequately determine whether the operation member which is operable by the operator is intentionally operated, the operation member is brought into an operated state irrespective of the intention of the operator, or an abnormality (such as a wire breakage) is caused in the signal circuit. By performing a determination on the basis of the rotational speed of the electric motor and the shift position of the vehicle, in contrast, it is possible to accurately determine whether or not the operation member is intentionally operated, whether or not an abnormality is caused in the signal circuit, and so forth. This makes it possible to appropriately permit disconnection of the relay.

In a relay control device according to a second aspect of the embodiment, the relay disconnection permitting unit may permit disconnection of the relay in the case where an absolute value of the rotational speed detected by the rotational speed detection unit is less than a predetermined value and the shift position detected by the shift position detection unit is a non-drive position.

With the relay control device according to the second aspect of the embodiment, in the case where the absolute value of the rotational speed is less than a predetermined value (equal to zero, for example) and the shift position is a non-drive position (such as a parking position or a neutral position, for example), it is determined that it is likely that the signal circuit is intentionally changed into the disconnected state because of inspection work or the like, and disconnection of the relay can be permitted adequately.

This makes it possible to secure operational safety and marketability, and to also secure safety during work.

In a relay control device according to a third aspect of the embodiment, the state sensing unit may be capable of sensing that the signal circuit is changed into a connected state, the relay disconnection permitting unit may be capable of denying permission of disconnection of the relay, and the relay control device may further include a storage unit (also implemented by the battery ECU 8 according to the embodiment, for example) that stores disconnection denial information in the case where the state sensing unit senses that the signal circuit is changed into the disconnected state and the relay disconnection permitting unit denies permission of disconnection of the relay, and a relay disconnection prohibiting unit (also implemented by the battery ECU 8 according to the embodiment, for example) that prohibits disconnection of the relay, even if a condition for the relay disconnection permitting unit to permit disconnection of the relay is met, over a period until the disconnection denial information stored in the storage unit is deleted.

In the relay control device according to the third aspect of the embodiment, in the case where it is determined that it is unlikely that the signal circuit is intentionally changed into the disconnected state and permission of disconnection of the relay is denied, for example, disconnection denial information that indicates the denial of permission of disconnection is stored, and disconnection of the relay is prohibited, even if the rotational speed of the electric motor and the shift position of the vehicle meet conditions for permitting disconnection of the relay, over a period until the stored disconnection denial information is deleted. Thus, it is possible to prevent the relay from being excessively disconnected in opposition to the intention of the driver, and to secure operational safety and marketability.

In a relay control device according to a fourth aspect of the embodiment, the disconnection denial information stored in the storage unit may be deleted in the case where the state sensing unit senses that the signal circuit is changed into the connected state.

With the relay control device according to the fourth aspect of the embodiment, in the case where it is sensed that the signal circuit is changed into the connected state, the stored disconnection denial information is deleted so that disconnection of the relay is permitted in the case where a condition for the relay disconnection permitting unit to permit disconnection of the relay is met thereafter. This makes it possible to have the intention of the driver appropriately reflected in whether or not to disconnect the relay, and to secure operational safety and marketability.

A relay control device according to a fifth aspect of the embodiment may further include a charge prohibiting unit (also implemented by the battery ECU 8 according to the embodiment, for example) that prohibits charge of the electricity accumulation device from a charge device, which is provided external to the vehicle and capable of charging the electricity accumulation device, in the case where the relay disconnection permitting unit permits disconnection of the relay.

In the relay control device according to the fifth aspect of the embodiment, in the case where the relay disconnection permitting unit permits disconnection of the relay, the charge prohibiting unit prohibits charge of the electricity accumulation device from the charge device by commanding disconnection of the relay which is capable of disconnecting continuity between the charge device and the electricity accumulation device, or commanding the charge device to stop charge, for example.

This makes it possible to secure safety during work such as inspection work in addition to preventing the charge device from performing useless charge operation.

Obviously, numerous modifications and variations of the present invention are possible in light of the above teachings. It is therefore to be understood that within the scope of the appended claims, the invention may be practiced otherwise than as specifically described herein.

What is claimed is:

1. A relay control system for an electric vehicle, comprising:
    an electric power line connecting an electricity accumulation device to an electric motor in the electric vehicle, the electricity accumulation device being configured to accumulate electric power, the electric motor being configured to output a drive force to move the electric vehicle;
    a relay disposed on the electric power line and configured to disconnect an electrical connection between the electricity accumulation device and the electric motor;
    an operation member configured to be operated by an operator to bring the relay into a disconnected state;
    a state sensor configured to sense that a signal circuit through which a signal related to a state of the operation member flows is changed into a disconnecting operation state;
    a rotational speed detector configured to detect a rotational speed of the electric motor;
    a shift position detector configured to detect a shift position of the electric vehicle; and
    a relay disconnection permitting device permitting disconnection of the relay based on the rotational speed detected by the rotational speed detector and the shift position detected by the shift position detector if the state sensor senses that the signal circuit is changed into the disconnecting operation state.

2. The relay control system according to claim 1,
    wherein the relay disconnection permitting device permits disconnection of the relay if an absolute value of the rotational speed detected by the rotational speed detector is less than a predetermined value and the shift position detected by the shift position detector is a non-drive position.

3. The relay control system according to claim 1,
    wherein the state sensor is configured to sense that the signal circuit is changed into a connecting operation state, and
    wherein the relay disconnection permitting device is configured to deny permission of disconnection of the relay.

4. The relay control system according to claim 3, further comprising:
    a storage device configured to store disconnection denial information if the state sensor senses that the signal circuit is changed into the disconnecting operation state and the relay disconnection permitting device denies permission of disconnection of the relay; and
    a relay disconnection prohibiting device prohibiting disconnection of the relay, even if a condition for the relay disconnection permitting device to permit disconnection of the relay is met, over a period until the disconnection denial information stored in the storage device is deleted.

5. The relay control system according to claim 4,
    wherein the disconnection denial information stored in the storage device is deleted if the state sensor senses that the signal circuit is changed into the connecting operation state.

6. The relay control system according to claim 1, further comprising:
    a charge prohibiting device prohibiting charge of the electricity accumulation device from a charge device if the relay disconnection permitting device permits disconnection of the relay, the charge device being provided external to the electric vehicle and configured to charge the electricity accumulation device.

7. The relay control system according to claim 2,
    wherein the relay disconnection permitting device prohibits disconnection of the relay if the absolute value of the rotational speed detected by the rotational speed detector is equal to or greater than the predetermined value.

8. The relay control system according to claim 7,
    wherein the relay disconnection permitting device prohibits disconnection of the relay if the shift position detected by the shift position detector is a position other than the non-drive position.

9. The relay control system according to claim 2,
    wherein the relay disconnection permitting device prohibits disconnection of the relay if the shift position detected by the shift position detector is a position other than the non-drive position.

10. A relay control system for an electric vehicle, comprising:
    connecting means for connecting an electricity accumulation device to an electric motor in the electric vehicle, the electricity accumulation device being configured to accumulate electric power, the electric motor being configured to output a drive force to move the electric vehicle;
    disconnecting means for disconnecting an electrical connection between the electricity accumulation device and the electric motor;
    operation means for being operated by an operator to bring the disconnecting means into a disconnected state;
    state sensing means for sensing that a signal circuit through which a signal related to a state of the operation means flows is changed into a disconnecting operation state;
    rotational speed detecting means for detecting a rotational speed of the electric motor;
    shift position detecting means for detecting a shift position of the electric vehicle; and
    disconnection permitting means for permitting disconnection of the disconnecting means based on the rotational speed detected by the rotational speed detecting means and the shift position detected by the shift position detecting means if the state sensing means senses that the signal circuit is changed into the disconnecting operation state.

11. A method for controlling a relay of an electric vehicle, comprising:
    sensing that a signal circuit through which a signal related to a state of a operation member flows is changed into a disconnecting operation state, the operation member being configured to be operated by an operator to bring the relay into a disconnected state, the relay being configured to disconnect an electrical connection between an electricity accumulation device and an electric motor in the electric vehicle;
    detecting a rotational speed of the electric motor;
    detecting a shift position of the electric vehicle; and
    permitting disconnection of the relay based on the rotational speed detected in the detecting of the rotational speed and the shift position detected in the detecting of the shift position if it is sensed that the signal circuit is changed into the disconnecting operation state.

12. The method according to claim 11,
wherein, in the permitting of the disconnection of the relay, disconnection of the relay is permitted if an absolute value of the rotational speed detected in the detecting of the rotational speed is less than a predetermined value and the shift position detected in the detecting of the shift position is a non-drive position.

13. The method according to claim 11, further comprising:
storing disconnection denial information in a storage device if it is sensed that the signal circuit is changed into the disconnecting operation state and permission of disconnection of the relay is denied; and
prohibiting disconnection of the relay, even if a condition that disconnection of the relay is permitted is met, over a period until the disconnection denial information is deleted from the storage device.

14. The method according to claim 13, further comprising:
deleting the disconnection denial information from the storage device if it is sensed that the signal circuit is changed into a connecting operation state.

15. The method according to claim 11, further comprising:
prohibiting charge of the electricity accumulation device from a charge device provided external to the electric vehicle if disconnection of the relay is permitted, the charge device being configured to charge the electricity accumulation device.

16. The method according to claim 12, further comprising:
prohibiting disconnection of the relay if the absolute value of the rotational speed detected in the detecting of the rotational speed is equal to or greater than the predetermined value.

17. The method according to claim 16, further comprising:
prohibiting disconnection of the relay if the shift position detected in the detecting of the shift position is a position other than the non-drive position.

18. The method according to claim 12, further comprising:
prohibiting disconnection of the relay if the shift position detected in the detecting of the shift position is a position other than the non-drive position.

* * * * *